United States Patent Office
2,833,689
Patented May 6, 1958

2,833,689

FUNGICIDAL COMPOSITIONS COMPRISING BENZOTHIAZOLE AND BENZOXAZOLE CARBONIC ACID ESTERS AND METHOD OF CONTROL OF FUNGI

Henry J. Gerjovich, Wilmington, Del., assignor to E. I. du Pont de Nemours and Company, Wilmington, Del., a corporation of Delaware No Drawing. Application March 15, 1957
Serial No. 646,212

4 Claims. (Cl. 167—33)

This invention relates to lower aliphatic esters of benzothiazole and benzoxazole carbamic and thiocarbamic acids, and to fungicidal compositions and methods employing these compounds for the protection of organic matter subject to fungus infection.

I have found that the compounds represented by the following formula are extremely effective as active ingredients in fungicidal compositions and methods:

(1)
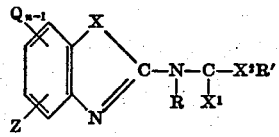

wherein X, $X^1$ and $X^2$ are selected from the group consisting of oxygen and sulfur, R is selected from the group consisting of hydrogen and lower alkyl groups of less than five carbon atoms, R' is an aliphatic hydrocarbon radical of less than five carbon atoms, Q is halogen, Z is selected from the group consisting of hydrogen and nitro, and n is a whole number less than 4.

R in the above formula, a lower alkyl group of less than five carbon atoms, is methyl, ethyl, propyl, isopropyl, butyl, isobutyl, sec. butyl or tert. butyl.

R' in the above formula, an aliphatic hydrocarbon radical of less than five carbon atoms, can be an alkyl such as those listed above. Alternatively, R' can be an alkenyl such as vinyl, allyl, propargyl and butenyl.

In the preferred compositions and methods of my invention, I employ the lower alkyl esters of the type represented by Formula 1, in which case R is hydrogen and R' is an unsubstituted lower alkyl group of 1 thru 4 carbon atoms. Thus the preferred compounds are the lower alkyl esters of benzothiazole carbamic acid; the lower alkyl esters of benzothiazole thiocarbamic acid; the lower alkyl esters of halogen substituted benzothiazole carbamic acids; and the lower alkyl esters of benzothiazole dithiocarbamic acid. Of these preferred compounds, the most preferred from the standpoint of ease of preparation and fungicidal effectiveness are the lower alkyl esters of benzothiazole carbamic acid, and of this group 2-benzothiazole carbamic acid, methyl ester appears to be by far the best compound from the standpoint of activity and ease and economy of preparation.

The fungicidally active compounds of the above formula can be prepared by various conventional means. For example, they can be prepared by the reaction of a chloroformate, a chlorothiolformate, a chlorothionylformate or chlorodithioformate with an amino benzothiazole or an amino benzoxazole, as is illustrated with specific reactants in the following equations:

(2)
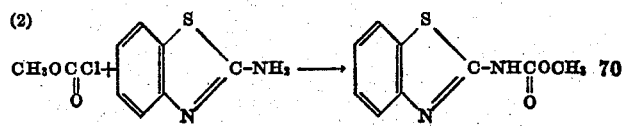

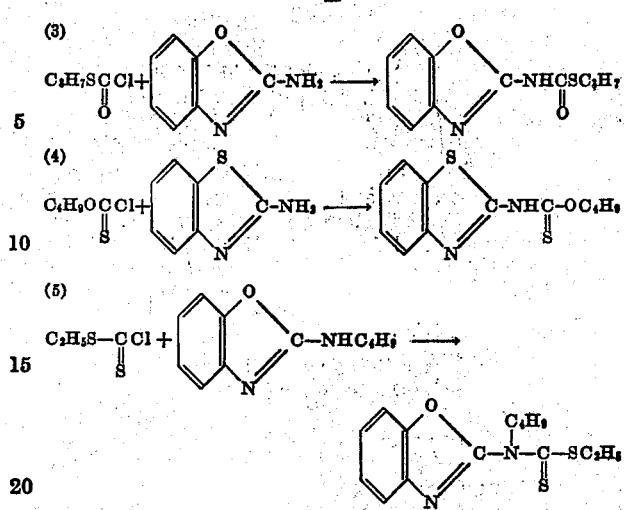

The above type reactions are carried out by bringing the reactants together in approximately stoichiometric proportions, in an inert liquid medium such as dioxane, toluene, benzene or acetone. No catalyst is needed but in many cases it is desirable to use an excess of the formate reactant, for example 5–10% molar excess. Ordinarily temperatures in the range of 25–110° C. are employed for these reactions. To promote good yields of the active compounds, an acid acceptor such as triethylamine or pyridine is included in the reaction mixture in a molar amount equal to the amount of amine present. The product resulting directly from this reaction is of relatively low purity and in some instances it is not completely satisfactory for direct usage. For this reason the product will sometime be purified such as by treating with glacial acetic acid. This treatment is particularly desirable, yielding excellent purity material.

The reaction represented by the equation 2 can also be carried out in an aqueous medium providing the reaction mass is maintained at 70°–110° C., preferably at 80°–100° C. An excess of up to 100% of the chloroformate is used. However, the pH of the reaction mixture must be controlled so as to be maintained within the range from pH 4–9. The chloroformate can be introduced into the reaction vessel either above or below the aqueous level, although better results are obtained by introducing it below the liquid surface. No noticeable decomposition of the chloroformate by the water takes place. This process is ideally adapted for continuous operation, such as in a pipe reactor. A high purity product is obtained directly without requiring any recrystallization or other purification step. This product precipitates from the reaction mass and can be filtered, dried and used directly in fungicidal compositions.

The fungicidally active thiono carbamates can also be prepared by reacting a 2-chlorobenzothiazole or a 2-chlorobenzoxazole with an alkali metal thiocyanate in a large excess of an alcohol, as shown by the following illustrative equation:

(6)
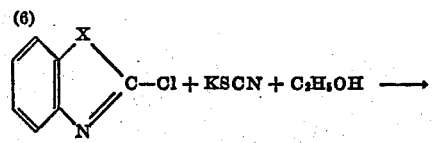

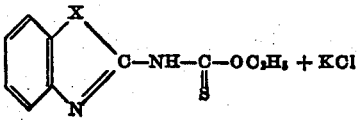

The lower alkyl esters of benzothiazole and benzoxazole carbamic and thiocarbamic acids are in most instances off-white or yellow solids, having melting points in the range of 40–250° C. They are relatively insoluble in water and only moderately soluble in solvents such as dioxane, acetone, alcohols and liquid hydrocarbons.

In practicing the fungicidal methods of my invention, one or more of the active ingredients is applied to the organic material to be treated for the control of fungi at a dosage sufficient to exert fungicidal action. Accordingly, my compositions and methods are applicable for the protection of carbohydrates, proteins and fats. They are particularly suited for the treating of living plants such as vegetables, ornamental plants and fruit-bearing trees. Some of these compositions are also effective when applied directly to the soil for controlling plant fungi. Also they can be used to treat organic fibers and fabrics and various cellulosic materials such as leather and wood. Likewise they can be used to treat paints and lubricating oils.

In application to plants, fungicidal control is obtained in most instances by applying the active compound at a dosage or rate from about 0.5 to 10.0 pounds per acre, the optimum amount within this range being largely dependent upon the variables mentioned heretofore. In application directly to the soil for use as a systemic fungicide, in most instances, the dosage or rate is from about 1 to 75 pounds per acre. The optimum dosage can be determined in each instance by one of the means conventional in the art. It is of course, determined by and dependent upon the particular fungicidal compound selected, the method of application, and, in the case of application to vegetation, the state and condition of growth of the vegetation to be treated, and the climatic conditions.

The fungicidal compositions of my invention contain in sufficient amount to exert fungicidal action one or more of the above-described active compounds in admixture with a carrier material or conditioning agent of the kind used and commonly referred to in the art as a fungicide adjuvant or modifier. The conventional fungicide adjuvants are inert solids, hydrocarbon liquid diluents and surface-active agents. They provide formulations adapted for ready and efficient application using conventional applicator equipment. Usually from about 1–95% by weight of the fungicidal composition is active ingredient.

Solid compositions are preferably in the form of powders. They are compounded to be homogeneous powders that can be either used as such, diluted with inert solids to form dusts, or suspended in a suitable liquid medium for spray application. They powders usually comprise active ingredient admixed with minor amounts of conditioning agent. Natural clays, either adsorptive such as attapulgite or relatively non-absorptive such as kaolin clays, diatomaceous earth, walnut shell flour, tobacco dust, redwood flour, synthetic fine silica, calcium silicate and other inert solid carriers of the kind conventionally employed in powder fungicidal compositions can be used. The active ingredient usually makes up from about 25–90% of these powder compositions. For conversion of the powders to dusts talc, pyrophyllite, tobacco dust, volcanic ash and other dense, rapid-settling inert solids customarily are used.

Liquid compositions employing one or more of the fungicidally-active ingredients are prepared by admixing the active ingredient with a suitable liquid diluent medium. The active ingredient can be either in solution or in suspension in the liquid medium. Typical of the liquid media commonly employed as fungicide adjuvants are kerosene, Stoddard solvent, xylene, alcohols, alkylated naphthalene and glycols. The active ingredient usually makes up from about 0.5 to 50% of these liquid compositions. Some of these compositions are designed to be used as such, and others to be extended with large quantities of water.

Compositions in the form of wettable powders or liquids in many cases also include one or more surface-active agents such as wetting, dispersing or emulsifying agents. These materials cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Sanitary Chemicals," August, September and October of 1949.

In some cases it may be desirable to employ the active compounds of the present invention in combination with other fungicides to give compositions that have broad spectrum fungicidal activity. In these mixtures, the fungicidally active materials can be present in any desired amount, ordinarily from about 0.1–20 parts by weight of a compound represented by Formula 1 per part by weight of the auxiliary fungicidally active material. In some instances it may even be desirable to employ two or more auxiliary fungicides.

Typical of the auxiliary fungicides that can be employed in combination with the compounds of the present invention are the following:

N-trichloro-methylthio-4-cyclohexene-1,2-dicarboximide
Tetramethylthiuram disulfide
Manganese ethylene-bis-dithiocarbamate
Ferric dimethyl dithiocarbamate
Zinc ethylene-bis-dithiocarbamate
Zinc dimethyl dithiocarbamate (ziram)
Tetra copper calcium oxychloride
Tetrachloro-p-benzoquinone (chloranil)
2,3-dichloro-1,4-naphthoquinone (dichlone)
2-dichloro-6-(o-chloroanilino)triazine (dyrene)
Ethylene thiuram monosulfide
2-heptadecyl glyoxalidine acetate (glyodin)
Ferric dimethyl dithiocarbamate plus 2-mercaptobenzothiazole
Manganese dimethyl dithiocarbamate plus 2-mercaptobenzothiazole
Copper dihydrazinium sulfate
Copper-8-quinolinolate
Cycloheximide
Terramycin
Streptomycin In order that the invention may be better understood, the following examples are given in addition to those already set forth above:

Example 1

One hundred and five parts by weight of methyl chloroformate (10% molar excess) is added gradually with stirring to a solution at room temperature of 150 parts by weight of 2-aminobenzothiazole and 101 parts by weight of triethylamine dissolved in 700 parts by weight of dioxane. After stirring the reaction mixture for an additional 1½ hours at room temperature, a total of 1500 parts by weight of water is added to the reaction, causing the formation of a precipitate. The precipitate is removed from the reaction mixture by filtration. Subsequent recrystallization of this solid from glacial acetic acid gives a 59% yield of essentially pure 2-benzothiabole carbamic acid, methyl ester having a melting point of 223° C. with decomposition.

Analysis.—Calcd. for $C_9H_8N_2O_2S$; N, 13.46; S, 15.38. Found: N, 13.13; 13.18; S, 15.56.

A 0.04% by weight water suspension of this compound is prepared and applied as a foliar spray to apple and cucumber foliage infected with established sporulating mildew colonies (Podosphaera oxyacanthae, Erysiphe cichoracearum). This treatment gives substantially complete cure of the infection, thereby demonstrating the curative fungicidal activity of this compound.

The foliage of uninfected cucumber plants is also sprayed with this 0.04% water suspension of 2-benzothiazole carbamic acid, methyl ester. Thereafter the treated cucumber plants are exposed to powdery mildew fungus (*Erysiphe cichoracearum*). Ten days after exposure to the mildew, a 0% disease rate is noted on the treated cucumber plants. In contrast, untreated cucumber plants that are exposed to the powdery mildew fungus under indentical conditions have a 100% disease rate. Thus, this compound is effective not only as a curative fungicide but also as a preventive fungicide.

A dilute water suspension of 2-benzothiazole carbamic acid, methyl ester is applied to cucumber plants by spraying at several dosages onto the surface of the soil in which the cucumber plants are growing. The cucumber plants are then exposed to powdery mildew fungus (*Erysiphe cichoracearum*). The plants treated with 50 pounds per acre of the active ingredient are substantially completely protected from infection whereas plants that are untreated show a 100% disease rate. Thus this compound is also effective as a systemic fungicide.

Example 2

2-benzothiazole carbamic acid, ethyl ester is prepared in accordance with the procedure of Example 1 by substituting for the methyl chloroformate molar equivalent amounts of chloroethyl formate. This compound has a melting point at 212–215° C.

*Analysis.*—Calcd. for $C_{10}H_{10}N_2O_2S$: N, 12.61. Found: N, 12.47; N, 12.78.

This compound is formulated into a dust that is suitable for application by means of conventional dusting equipment by blending the listed ingredients together and passing them through a micropulverizer.

| Ingredient: | Percent by weight |
|---|---|
| 2-benzothiazole carbamic acid, ethyl ester | 25 |
| Pyrophyllite | 75 |

This fungicidal composition, when dusted on tomato foliage at the rate of 6 pounds of active ingredient per acre, prevents early blight (*Alternaria solani*).

Example 3

2-benzothiazole carbamic acid, allyl ester is prepared in accordance with the procedure of Example 1 by substituting for the methyl chloroformate of Example 1 molar equivalent amounts of chloroallylformate.

This compound is formulated into a fungicidal dust by blending the listed ingredients together and passing them through a mocropulverizer.

| Ingredient: | Percent by weight |
|---|---|
| 2-benzothiazole carbamic acid, allyl ester | 20 |
| Tobacco dust | 80 |

This composition, when dusted on pear trees at the rate of 20 lbs./acre of active ingredient, prevents pear powdery mildew (*Podosphaera leucotricha*).

Example 4

2-benzothiazole carbamic acid, propyl ester is prepared in accordance with the procedure of Example 1 by substituting for the methyl chloroformate of Example 1 molar equivalent amounts of chloropropylformate. This compound has a melting point of 169° C.

*Analysis.*—Calcd. for $C_{11}H_{12}N_2O_2S$: N, 11.38; S, 13.01. Found: N, 11.68, 11.74; S, 13.47, 13.60.

The following dust composition, when dusted on apple trees at the rate of 20 lbs. of active ingredient per acre, prevents apple scab (*Venturia inaequalis*).

| Ingredient: | Percent by weight |
|---|---|
| 2-benzothiazole carbamic acid, propyl ester | 20 |
| Pyrophyllite | 80 |

2-(6-chlorobenzothiazole)carbamic acid, methyl ester is prepared in accordance with the procedure of Example 1 by substituting for the amino reactant of Example 1 a molar equivalent amount of 2-amino-6-chlorobenzothiazole.

This compound is formulated into a wettable powder fungicidal composition by blending the listed ingredients together and passing them twice through a micropulverizer. The resulting powder disperses readily in water to yield a fungicidal spray composition.

| Ingredient: | Percent by weight |
|---|---|
| 2-(6-chlorobenzothiazole)carbamic acid, methyl ester | 80 |
| Alkyl naphthalene sulfonic acid sodium salt | 0.75 |
| Low viscosity methyl cellulose | 0.25 |
| Silica | 19 |

This wettable powder, when dispersed in water at a concentration of 6 lbs. per 100 gallons of water and sprayed on tomato foliage at a rate of 100 gallons per acre, prevents early blight (*Alternaria solani*).

Example 6

2-(4-nitrobenzothiazole)carbamic acid, methyl ester is prepared in accordance with the procedure of Example 1 by substituting for the amino reactant of Example 1 a molar equivalent amount of 2-amino-4-nitrobenzothiazole.

The following wettable powder, when dispersed in water at a concentration of 8 lbs. of active ingredient per 200 gallons of water, and sprayed on apple trees at a rate of 200 gallons per acre, prevents apple scab (*Venturia inaequalis*).

| Ingredient: | Percent by weight |
|---|---|
| 2-(4-nitrobenzothiazole)carbamic acid, methyl ester | 80 |
| Alkyl naphthalene sulfonic acid sodium salt | 0.75 |
| Low viscosity methyl cellulose | 0.25 |
| Diatomaceous earth | 19 |

Example 7

2-(5,6-dichlorobenzothiazole)carbamic acid, methyl ester is prepared in accordance with the procedure of Example 1 by substituting for the amino reactant of Example 1 a molar equivalent amount of 2-amino-5,6-dichlorobenzothiazole.

The following wettable powder, when dispersed in water at a concentration of 6 lbs. per 100 gallons of water and sprayed on tomato foliage at a rate of 100 gallons per acre, prevents early blight (*Alternaria solani*).

| Ingredient: | Percent by weight |
|---|---|
| 2-(5,6-dichlorobenzothiazole)carbamic acid, methyl ester | 80 |
| Alkyl naphtalene sulfonic acid sodium salt | 0.75 |
| Low viscosity methyl cellulose | 0.25 |
| Synthetic fine silica | 19 |

Example 8

Thiol-2-benzothiazolecarbamic acid, methyl ester is prepared in accordance with the procedure of Example 1 by substituting for the reactants of Example 1 molar equivalent amounts of 2-aminobenzothiazole and chloromethylthiolformate.

The following wettable powder composition is then diluted with water to give a 0.2% concentration of the active ingredient. The resultant composition, when sprayed on tomato foliage, prevents early blight (*Alternaria solani*).

| Ingredient: | Percent by weight |
|---|---|
| Thiol-2-benzothiazolecarbamic acid, methyl ester | 80 |
| Alkyl naphthalene sulfonic acid sodium salt | 0.75 |
| Low viscosity methyl cellulose | 0.25 |
| Diatomaceous earth | 19 |

Example 9

2-benzothiazoledithiocarbamic acid, methyl ester is prepared in accordance with the procedure of Example 8 by substituting for the chloromethylthiolformate of Example 8 a molar equivalent amount of chloromethyldithiolformate.

The following dust fungicidal composition, when dusted on tomato foliage at the rate of 6 pounds of active ingredient per acre, prevents early blight (*Alternaria solani*).

| Ingredient: | Percent by weight |
|---|---|
| 2-benzothiazoledithiocarbamic acid, methyl ester | 30 |
| Pyrophyllite | 70 |

Example 10

2-benzothiazoledithiocarbamic acid, isopropyl ester is prepared in accordance with Example 1 by substituting for the methyl chloroformate of Example 1 a molar equivalent amount of chloroisopropyl dithioformate.

The following wettable powder, when dispersed in water at a concentration of 6 pounds per 100 gallons of water and sprayed on tomato foliage at a rate of 100 gallons per acre, prevents early blight (*Alternaria solani*).

| Ingredient: | Percent by weight |
|---|---|
| 2-benzothiazoledithiocarbamic acid, isopropyl ester | 50 |
| Sodium lauryl sulfate | 0.5 |
| Sodium lignin sulfonate | 1 |
| Kaolin clay | 48.5 |

Example 11

2-benzoxazolecarbamic acid, methyl ester is prepared in accordance with the procedure of Example 1 by substituting for the 2-aminobenzothiazole of Example 1 a molar equivalent amount of 2-aminobenzoxazole.

The following wettable powder, when dispersed in water at the rate of 8 lbs. of active material per 200 gallons of water and sprayed on apple trees at a rate of 200 gallons per acre, prevents apple powdery mildew (*Podosphaera leucotricha*).

| Ingredient: | Percent by weight |
|---|---|
| 2-benzoxazolecarbamic acid, methyl ester | 20 |
| Sodium lauryl sulfate | 0.25 |
| Sodium lignin sulfonate | .5 |
| Kaolin clay | 79.25 |

Example 12

2-(5-chlorobenzoxazole)carbamic acid, methyl ester is prepared in accordance with the procedure of Example 1 by substituting for the 2-aminobenzothiazole of Example 1 a molar equivalent amount of 2-amino-5-chlorobenzoxazole.

The following dust composition, when dusted on apple trees at the rate of 20 lbs. of active ingredient per acre, prevents apple powdery mildew (*podosphaera leucotricha*).

| Ingredient: | Percent by weight |
|---|---|
| 2-(5-chlorobenzoxazole)carbamic acid, methyl ester | 20 |
| Talc | 80 |

Example 13

Thiol-2-benzoxazolecarbamic acid, isopropyl ester is prepared in accordance with the procedure of Example 11 by substituting for the methylchloroformate of Example 11 a molar equivalent amount of chloroisopropylthiolformate.

The following dust composition, when dusted on the ground where roses are planted at the rate of 10 lbs. of active ingredient per acre, cures rose powdery mildew (*Sphaerotheca humuli*).

| Ingredient: | Percent by weight |
|---|---|
| Thiol-2-benzoxazolecarbamic acid, isopropyl ester | 30 |
| Talc | 70 |

Example 14

2-benzoxazoledithiocarbamic acid, methyl ester is prepared in accordance with the procedure of Example 13 by substituting for the chloroisopropylthiolformate of Example 13 a molar equivalent amount of chloromethyldithioformate.

The following dust composition, when dusted on grape vines at the rate of 20 lbs. of active ingredient per acre, prevents grape powdery mildew (*Uncinula necator*).

| Ingredient: | Percent by weight |
|---|---|
| 2-benzoxazoledithiocarbamic acid, methyl ester | 20 |
| Ground phosphate rock | 80 |

Example 15

2-(5-chlorobenzoxazole)dithiocarbamic acid, butyl ester is prepared in accordance with the procedure of Example 1 by substituting for the reactants of Example 1 molar equivalent amounts of 2-amino-5-chlorobenzoxazole and chlorobutyldithioformate.

The following dust composition, when dusted on the surface of the soil in which cucumbers are planted at a rate of 10 lbs. of active ingredient per acre, cures cucumber powdery mildew (*Erysiphe cichoracearum*).

| Ingredient: | Percent by weight |
|---|---|
| 2-(5-chlorobenzoxazole)dithiocarbamic acid, butyl ester | 30 |
| Ground phosphate rock | 70 |

Example 16

N-methyl-2-benzoxazolecarbamic acid, methyl ester is prepared in accordance with the procedure of Example 1 by substituting for the 2-aminobenzothiazole of Example 1 a molar equivalent amount of 2-N-methylaminobenzoxazole. This compound has a melting point of 103–104° C.

Analysis.—Calcd. for $C_{10}H_{10}N_2O_3$: C, 58.25; H, 4.85. Found: C, 58.00, 58.39; H, 4.95, 5.07.

The following wettable powder composition is then diluted with water to give a 0.2% concentration of the active ingredient. The resultant composition, when sprayed on tomato foliage, prevents early blight (*Alternaria solani*).

| Ingredient: | Percent by weight |
|---|---|
| N-methyl-2-benzoxazolecarbamic acid, methyl ester | 80 |
| Alkyl naphthalene sulfonic acid sodium salt | 0.75 |
| Low viscosity methyl cellulose | 0.25 |
| Attapulgite | 19 |

Example 17

N-methyl-2-benzothiazolecarbamic acid, methyl ester is prepared in accordance with the procedure of Example 1 by substituting for the 2-aminobenzothiazole of Example 1 a molar equivalent amount of 2-N-methylaminobenzothiazole. This compound has a melting point of 115° C.

Analysis.—Calcd for $C_{10}H_{10}N_2O_2S$: N, 12.61; Found: N, 12.61.

The following wettable powder, when dispersed in water at a concentration of 6 pounds per 100 gallons of water and sprayed on tomato foliage at a rate of 100 gallons per acre, prevents early blight (*Alternaria solani*).

| Ingredient: | Percent by weight |
|---|---|
| N-methyl-2-benzothiazolecarbamic acid, methyl ester | 80 |
| Alkyl naphthalene sulfonic acid sodium salt | 0.75 |
| Low viscosity methyl cellulose | 0.25 |
| Silica | 19 |

Example 18

N-methyl-2-benzothiazolecarbamic acid, ethyl ester is prepared in accordance with the procedure of Example 17 by substituting for the chloromethylformate of Example 17 a molar equivalent amount of chloroethylformate. This compound has a melting point of 102° C.

Analysis.—Calcd. for $C_{11}H_{12}N_2O_2S$: N, 11.86; S, 13.65. Found: N, 11.71, 11.54; S, 13.32.

The following dust fungicidal composition, when dusted on tomato foliage at the rate of 6 pounds of active ingredient per acre, prevents early blight (Alternaria solani).

| Ingredient: | Percent by weight |
|---|---|
| N-methyl-2-benzothiazolecarbamic acid, ethyl ester | 20 |
| Stearated calcium carbonate | 80 |

Example 19

N-butyl-thiol-2-benzothiazolecarbamic acid, isopropyl ester is prepared in accordance with the procedure of Example 1 by substituting for the reactants of Example 1 molar equivalent amounts of 2-N-butylaminobenzothiazole and chloroisopropylthiolformate.

The following dust fungicidal composition, when dusted on tomato foliage at the rate of 6 pounds of active ingredient per acre, prevents early blight (Alternaria solani).

| Ingredient: | Percent by weight |
|---|---|
| N-butyl-thiol-2-benzothiazolecarbamic acid, isopropyl ester | 20 |
| Tobacco dust | 80 |

Example 20

N-methyl-2-benzothiazoledithiocarbamic acid, methyl ester is prepared in accordance with the procedure of Example 1 by substituting for the reactants of Example 1 molar equiavlent amounts of 2-N-methylaminobenzothiazole and chloromethyldithioformate.

The following wettable powder composition is then diluted with water to give a 0.2% concentration of the active ingredient. The resultant composition, when sprayed on tomato foliage prevents early blight (Alternaria solani).

| Ingredient: | Percent by weight |
|---|---|
| N-methyl-2-benzothiazoledithiocarbamic acid, methyl ester | 50 |
| Sodium lauryl sulfate | 0.52 |
| Sodium lignin sulfonate | 1 |
| Diatomaceous earth | 48.48 |

Example 21

N-methyl-thiol-2-benzoxazolecarbamic acid, methyl ester is prepared in accordance with the procedure of Example 1 by substituting for the reactants of Example 1 molar equivalent amounts of 2-N-methylaminobenzoxazole and chloromethylthiolformate.

The following wettable powder, when dispersed in water at a concentration of 6 pounds per 100 gallons of water and sprayed on tomato foliage at a rate of 100 gallons per acre, prevents early blight (Alternaria solani).

| Ingredient: | Percent by weight |
|---|---|
| N-methyl-thiol-2-benzoxazolecarbamic acid, methyl ester | 20 |
| Sodium lauryl sulfate | 0.25 |
| Sodium lignin sulfonate | .5 |
| Kaolin clay | 79.25 |

Example 22

N-propyl-thiono-2-benzoxazolecarbamic acid, methyl ester is prepared in accordance with the procedure of Example 1 by substituting for the reactants of Example 1 molar equivalent amounts of 2-N-propylaminobenzoxazole and chloromethylthionoformate.

The following dust composition, when dusted on tomato foliage at the rate of 6 pounds of active ingredient per acre, prevents early blight (Alternaria solani).

| Ingredient: | Percent by weight |
|---|---|
| N-propyl-thiono-2-benzoxazolecarbamic acid, methyl ester | 30 |
| Tobacco dust | 70 |

Example 23

N-methyl-2-benzoxazoledithiocarbamic acid, methyl ester is prepared in accordance with the procedure of Example 1 by substituting for the reactants of Example 1 molar equivalent amounts of 2-N-methylaminobenzoxazole and chloromethyldithioformate.

The following wettable powder, when dispersed in water at a rate of 8 lbs. of active ingredient per 200 gallons of water and sprayed on apple trees at a rate of 200 gallons per acre, prevents apple scab (Venturia inaequalis).

| Ingredient: | Percent by weight |
|---|---|
| N-methyl-2-benzoxazoledithiocarbamic acid, methyl ester | 80 |
| Alkyl naphthalene sulfonic acid sodium salt | 0.75 |
| Low viscosity methyl cellulose | 0.25 |
| Diatomaceous earth | 19 |

Example 24

N-methyl-thiol-2-benzoxazolecarbamic acid, butyl ester is prepared in accordance with the procedure of Example 1 by substituting for the reactants of Example 1 molar equivalent amounts of 2-N-methylaminobenzoxazole and chlorobutylthiolformate.

The following wettable powder, when dispersed in water at the rate of 8 pounds of active ingredient per 200 gallons of water and sprayed on apple trees at a rate of 200 gallons per acre, cures apple powdery mildew (Podosphaera leucotricha).

| Ingredient: | Percent by weight |
|---|---|
| N-methyl-thiol-2-benzoxazolecarbamic acid, butyl ester | 50 |
| Sodium lauryl sulfate | 0.5 |
| Sodium lignin sulfonate | 1 |
| Kaolin clay | 48.5 |

Example 25

2-(6-nitrobenzothiazole)carbamic acid, methyl ester is prepared in accordance with the procedure of Example 1 by substituting for the amino reactant a molar equivalent amount of 2-amino-6-nitrobenzothiazole.

The following dust composition, when dusted on the surface of the soil in which cucumbers are planted at a rate of 10 lbs. of active ingredient per acre, prevents cucumber powdery mildew (Erysiphe cichoracearum).

| Ingredient: | Percent by weight |
|---|---|
| 2-(6-nitrobenzothiazole)carbamic acid, methyl ester | 30 |
| Tobacco dust | 70 |

Example 26

Thiol-2-benzoxazolecarbamic acid, methyl ester is prepared in accordance with the procedure of Example 1 by substituting for the reactants of Example 1 molar equivalent amounts of 2-aminobenzoxazole and chloromethylthiolformate.

The following dust composition when dusted on the surface of the soil in which melons are grown at a rate of 10 pounds of active ingredient per acre, prevents watermelon powdery mildew (Erysiphe cichoracearum).

| Ingredient: | Percent by weight |
|---|---|
| Thiol-2-benzoxazolecarbamic acid, methyl ester | 30 |
| Stearated calcium carbonate | 70 |

The following examples illustrate the preparation of the thiono carbamates in accordance with Equation 6. These compounds are formulated into fungicidal compositions and applied by substituting them for the active ingredient of any of the compositions of Examples 1 thru 26.

*Example 27*

16.9 parts by weight of 2-chlorobenzothiazole, 9.7 parts by weight of potassium thiocyanate and 350 parts by weight of isopropyl alcohol are mixed together and heated at reflux temperature for a period of fifteen hours. Upon cooling a precipitate forms, which is removed by filtration and washed with water to remove the potassium chloride. Subsequent recrystallization of the water-insoluble solid from isopropyl alcohol gives a 46.4 percent yield of essentially pure thiono-2-benzothiazole carbamic acid, isopropyl ester. This compound has a melting point of 176–177° C.

*Analysis.*—Calcd. for $C_{11}H_{12}N_2OS_2$: N, 11.11; S, 25.4. Found: N, 10.98; S, 25.68.

*Example 28*

Thiono-2-benzothiazolecarbamic acid, methyl ester is prepared in accordance with the procedure of Example 27 by substituting for the isopropanol of Example 27 350 parts by weight of methanol and refluxing the reaction mixture for 24 hours.

*Example 29*

Thiono-2-benzothiazolecarbamic acid, butyl ester is prepared in accordance with the procedure of Example 27 by substituting for the isopropanol of Example 27 300 parts by weight of butanol and refluxing the reaction mixture for 24 hours.

*Example 30*

Thiono-2-benzothiazolecarbamic acid, allyl ester is prepared in accordance with the procedure of Example 27 by substituting for the isopropanol of Example 27 300 parts by weight of allyl alcohol and refluxing the reaction mixture for a period of 4 hours.

*Example 31*

Thiono-2-(6-nitrobenzothiazole)carbamic acid, methyl ester is prepared in accordance with the procedure of Example 28 by substituting for the 2-chlorobenzothiazole of Example 28 a molar equivalent amount of 2-chloro-6-nitrobenzothiazole.

*Example 32*

Thiono-2-benzoxazolecarbamic acid, allyl ester is prepared in accordance with the procedure of Example 30 by substituting for the 2-chlorobenzothiazole of Example 30 a molar equivalent amount of 2-chlorobenzoxazole.

*Example 33*

Thiono-2-benzoxazolecarbamic acid, methyl ester is prepared in accordance with the procedure of Example 32 by substituting for the allyl alcohol of Example 32 350 parts by weight of methanol. This compound has a melting point of 145–147° C.

*Analysis.*—Calcd. for $C_9H_8N_2O_2S$: N, 13.46; S, 15.38. Found: N, 13.13, 13.18; S, 15.56.

*Example 34*

Thiono - 2 - (6 - chlorobenzothiazole)carbamic acid, methyl ester is prepared in accordance with the procedure of Example 33 by substituting for the 2-chlorobenzoxazole of Example 33 a molar equivalent amount of 2,6-dichlorobenzothiazole.

*Example 35*

Thiono-2-(6-chlorobenzoxazole)carbamic acid, methyl ester is prepared in accordance with the procedure of Example 34 by substituting for the 2,6-dichlorobenzothiazole of Example 34 a molar equivalent amount of 2,6-dichlorobenzoxazole.

*Example 36*

Thiono - 2 - (5,6 - dichlorobenzothiazole)carbamic acid, methyl ester is prepared in accordance with the procedure of Example 35 by substituting for the 2,6-dichlorobenzoxazole of Example 35 a molar equivalent amount of 2,5,6-trichlorobenzothiazole.

*Example 37*

Thiono-2-benzothiazolecarbamic acid, ethyl ester is prepared in accordance with the precedure of Example 27 by substituting for the isopropyl alcohol of Example 27 350 parts by weight of ethanol. This compound has a melting point of 170° C.

*Analysis.*—Calcd. for $C_{10}H_{10}N_2S_2O$: N, 11.76; S, 26.9. Found: N, 11.60; S, 26.33.

*Example 38*

Thiono-2-(6-nitrobenzothiazole)carbamic acid, allyl ester is prepared in accordance with the procedure of Example 27 by substituting for the reactants of Example 27 350 parts by weight of allyl alcohol and a molar equivalent amount of 2-chloro-6-nitrobenzothiazole.

*Example 39*

Thiono-2-(4-nitrobenzothiazole)carbamic acid, methyl ester is prepared in accordance with the procedure of Example 33 by using 350 parts by weight of methanol and substituting for the 2-chlorobenzoxazole of Example 33 a mloar equivalent amount of 2-chloro-4-nitrobenzothiazole.

*Example 40*

Thiono-2-(4-chlorobenzothiazole)carbamic acid, methyl ester is prepared in accordance with the procedure of Example 39 by substituting for the 2-chloro-4-nitrobenzothiazole of Example 39 a molar equivalent amount of 2,4-dichlorobenzothiazole.

*Example 41*

Thiono-2-(5,6-dichlorobenzothiazole)carbamic acid, allyl ester is prepared in accordance with the procedure of Example 32 by substituting for the 2-chlorobenzoxazole of Example 32 a molar equivalent amount of 2,5,6-trichlorobenzothiazole.

*Example 42*

Thiono-2-benzoxazolecarbamic acid, ethyl ester is prepared in accordance with the procedure of Example 37 by substituting for the 2-chlorobenzothiazole of Example 37 a molar equivalent amount of 2-chlorobenzoxazole. This compound has a melting point of 141–142° C.

*Analysis.*—Calcd. for $C_{10}H_{10}N_2SO_2$: N, 12.61; S, 14.41. Found: N, 12.58; S, 14.77.

*Example 43*

Thiono-2-(4-chlorobenzoxazole)carbamic acid, methyl ester is prepared in accordance with the procedure of Example 35 by substituting for the 2,6-dichlorobenzoxazole of Example 35 a molar equivalent amount of 2,4-dichlorobenzoxazole.

*Example 44*

Thiono - 2 - (5,7 - dichlorobenzoxazole)carbamic acid, methyl ester is prepared in accordance with the procedure of Example 43 by substituting for the 2,4-dichlorobenzoxazole of Example 43 a molar equivalent amount of 2,5,7-trichlorobenzoxazole.

*Example 45*

Thiono-2-(4-nitrobenzoxazole)carbamic acid, ethyl ester is prepared in accordance with the procedure of Example 42 by substituting for the 2-chlorobenzoxazole of Example 42 a molar equivalent amount of 2-chloro-4-nitrobenzoxazole.

*Example 46*

A stirred reaction vessel equipped with a reflux condenser is charged with 150 parts of 2-aminobenzothiazole and 1000 parts of hot tap water at 65° C. The suspension is heated to a temperature of 92–95° C. at which time only a small amount of the 2-aminobenzothiazole remains out of solution. At this time, and over a period of 1 hour, 131 parts of commercial methyl chloroformate is added below the surface of the reaction mixture. The methyl chloroformate is 79% purity, as determined by analysis. During this addition, 400 parts of 2.72 N sodium hydroxide is added to keep the pH at 6.5–7.2. Also during this addition, the product precipitates. At the end of the addition period, the reaction vessel is stirred for an additional ten minutes. The product is then collected upon a vacuum filter. After washing with 2000 parts of hot water (65° C.) and drying in a vacuum oven at 100° C., there is obtained 168 parts of high purity benzothiazolecarbamic acid, methyl ester having a melting point with decomposition at 224–227° C. Analysis by ultraviolet and infrared absorption spectral means shows the material to be of substantially 100% purity.

The following examples demonstrate fungicidal compositions containing an auxiliary fungicide in combination with a fungicidally active material of Formula 1.

*Example 47*

A thixotropic aqueous suspension of the following composition is prepared by milling together the listed ingredients until the particles are substantially less than 5 microns in diameter.

12 parts by weight 2-benzothiazole carbamic acid, methyl ester
30 parts by weight tetra methyl thiuram disulfide
1.5 parts by weight Florigel (a finely ground hydrated attapulgite)
5.0 parts by weight Goulac (sodium lignin sulfonate)
51.0 parts by weight water There is obtained a thixotropic suspension that can be diluted further with water to any desired use concentration.

This material is used in sprays at rates ranging from 1 pint to 3 pints per 100 gallons of water in high volume sprayers and from 2 quarts to 8 quarts per 100 gallons in low volume sprayers. Treatment is made in such a way as to provide even and continuous coverage of foliage and fruit to be protected.

Application to apples provides control of powdery mildew as well as scab, cedar apple rust, quince rust, frog-eye leaf spot, sooty blotch, fly speck and other diseases of the foliage and fruit. On roses, both powdery mildew and black spot are controlled. On other fruit and vegetable crops, including grapes and cucurbits, protection is furnished against powdery mildew and other diseases including downy mildew, anthracnose and black rot.

*Example 48*

A wettable powder of the following composition is prepared by mixing together the listed ingredients in a ribbon blender and then grinding in a hammer mill to a particle size substantially less than 20 microns in diameter.

18.5 parts by weight 2-benzothiazole carbamic acid, methyl ester
46.5 parts by weight tetra methyl thiuram disulfide
31.0 "Celite 209" (a finely ground diatomaceous earth)
1.0 Alkanol B (sodium alkyl naphthalene sulfonate)
3.0 Goulac This composition is used in sprays at rates ranging from 1 to 2 pounds per 100 gallons of water in high volume sprayers and from 4 to 16 pounds per 100 gallons in automatic concentrate machines. When applied in accordance with the procedure of Example 1, similar results are obtained.

*Example 49*

A free-flowing dust of the following composition is prepared by first blending together the fungicidally active ingredients and the Attaclay (a finely ground fuller's earth) and grinding in a hammer mill to a particle size substantially less than 20 microns, and then blending the resultant mixture with the dusting talc to give a free-flowing dust.

2.0 parts 2-benzothiazole carbamic acid, methyl ester
4.0 parts of manganese ethylene-bis-dithiocarbamate
4 Attaclay
90 dusting talc This material is applied with either hand or power-driven dusters at rates ranging from 15 pounds per acre on low-growing crops to 100 pounds per acre on tree fruits such as apples. Application is made frequently enough to maintain coverage of the foliage and fruit.

Treatment as indicated controls powdery mildew as well as other diseases on apples, peaches, grapes, roses, cucumbers, and beans. Other diseases that are controlled include: on apples—scab, cedar apple rust, quince rust, frog-eye leaf spot, sooty blotch and fly speck; on peaches —shot hole, brown rot, and peach curl; on grapes—black rot; on roses—black spot; on cucumbers—downy mildew and anthracnose; on beans—downy mildew and rust.

*Example 50*

A thixotropic aqueous suspension of the following composition is prepared by milling together the listed ingredients until the particles are substantially less than 5 microns in diameter.

10 parts by weight 2-benzothiazole carbamic acid, methyl ester
20 parts by weight manganese ethylene-bis-dithiocarbamate
1.5 parts Florigel
3.0 parts "Elvanol" 5105 polyvinyl alcohol
65.5 parts water There is thus obtained a thixotropic suspension that can be diluted with water to any desired use concentration.

This material is used in sprays at rates ranging from 1 pint to 3 pints per 100 gallons of water in high volume sprayers and from 2 quarts to 8 quarts per 100 gallons in low volume sprayers. Treatment is made in such a way as to provide even and continuous coverage of foliage and fruit to be protected.

Treatment as indicated controls powdery mildew as well as other diseases on apples, peaches, grapes, roses, cucumbers, and beans. Other diseases that are controlled include: on apples—scab, cedar apple rust, quince rust, frog-eye leaf spot, sooty blotch and fly speck; on peaches —shot hole, brown rot, and peach leaf curl; on grapes— black rot; on roses—black spot; on cucumbers—downy mildew and anthracnose; on beans—downy mildew and rust.

*Example 51*

A wettable powder of the following composition is prepared:

17 parts by weight 2-benzothiazole carbamic acid methyl ester
51 parts by weight ferric dimethyl dithiocarbamate
25 parts by weight China clay
5 parts by weight "Celite 209"
1 part by weight Alkanol B
1 part by weight Marasperse CB (sodium lignin sulfonate)

This preparation is used in sprays at rates ranging from 1 to 2 pounds per 100 gallons of water in volume sprayers and from 4 to 16 pounds per 100 gallons in automatic concentrate machines.

Treatment of apples provides control of powdery mildew as well as scab, black rot, Brooks spot, frog-eye leaf spot, blotch, bitter rot and fly speck. Powdery mildew and other diseases are also controlled on peaches, blueberries and raspberries.

Example 52

A free-flowing dust of the following composition is prepared:
2 parts by weight 2-benzothiazole carbamic acid methyl ester
6 parts by weight zinc ethylene-bis-dithiocarbamate
92 parts by weight pyrophyllite The two active ingredients are blended with an equal weight of the pyrophyllite and ground in a hammer mill. The remainder of the diluent is then added and the mixture is blended in a ribbon blender.

This material is applied with either hand or power-driven dusters at rates ranging from 15 pounds per acre on low-growing crops to 100 pounds per acre on tree fruits such as apples. Application is made frequently enough to maintain coverage of the foliage and fruit.

Applications as above to apples control powdery mildew in addition to scab, sooty blotch, Brooks spot and black rot. Powdery mildew and other diseases are also controlled on cucurbits, roses and beans.

Example 53

A wettable powder of the following composition is prepared:
14 parts by weight 2-benzothiazole carbamic acid, methyl ester
36 parts by weight N-trichloro-methyl-4-cyclohexene-1, 2-dicarboximide
48.7 parts Attaclay (a finely ground fuller's earth)
1 part Alkanol B
0.3 part Methocel 15 (a low viscosity methyl cellulose)

This composition, when used in accordance with the procedure of Example 48, gives similar fungicidal control.

Similar combination fungicidal compositions can be prepared in accordance with Examples 47–53 by replacing the axuiliary fungicide in those examples with an equal weight of the auxiliary fungicides in the above list.

The following list is further illustrative of the fungicidally active compounds of the invention. These compounds are prepared by the methods of Examples 1–46 using appropriate reactants. They are formulated into fungicidal compositions and used by substituting them for the active ingredients of the compositions of the above examples.

54. Thiol-2-(6-chlorobenzothiazole)carbamic acid, methyl ester
55. 2 - (5,6 - dichlorobenzothiazole)dithiocarbamic acid, methyl ester
56. Thiol-2-(6-chlorobenzothiazole)carbamic acid, isopropyl ester
57. 2-benzoxazolecarbamic acid, butyl ester
58. 2-benzothiazolecarbamic acid, allyl ester
59. 2(5-nitrobenzoxazole)carbamir acid, methyl ester
60. Thiol-2-(5-chlorobenzoxazole)carbamic acid, methyl ester
61. 2-(5-nitrobenzoxazole)dithiocarbamic acid, ethyl ester
62. N-methyl-thiol-2 - (6 - chlorobenzothiazole)carbamic acid, methyl ester
63. N-methyl - 2 - (6 - nitrobenzothiazole)dithiocarbamic acid, methyl ester
64. N-methyl - 2 - (5 - chlorobenzoxazole)dithiocarbamic acid, methyl ester
65. N-butyl-2-(5-nitrobenzoxazole)dithiocarbamic acid, methyl ester
66. 2-benzothiazolecarbamic acid, butenyl ester
67. 2-(6-iodobenzothiazole)carbamic acid, methyl ester
68. 2-(6-bromobenzothiazole)carbamic acid, methyl ester
69. 2-(6-fluorobenzothiazole)carbamic acid, methyl ester

Example 70

A thixotropic aqueous suspension of the following composition is prepared by milling together the listed ingredients until the particles are substantially less than 5 microns in diameter.

30 parts by weight 2-benzothiazole carbamic acid, methyl ester
1.5 parts Florigel
3.0 parts Elvanol 5105 polyvinyl alcohol
65.5 parts water There is thus obtained a thixotropic suspension that can be diluted with water to any desired use concentration.

This material is used in sprays at rates ranging from ½ pint to 2 pints per 100 gallons of water in high volume sprayers and from 1 quart to 4 quarts per 100 gallons in low volume sprayers. Treatment is made in such a way as to provide even and continuous coverage of foliage and fruit to be protected.

Treatment as indicated controls powdery mildew as well as other diseases on apples, peaches, grapes, roses, cucumbers, and beans. Other diseases that are controlled include: on apples—scab, cedar apple rust, quince rust, frog-eye leaf spot, sooty blotch and fly speck; on peaches—shot hole, brown rot, and peach leaf curl; on grapes—black rot; on roses—black spot; on cucumbers—downy mildew and anthracnose; on beans—downy mildew and rust.

Example 71

An oil suspension formulation of the following composition is prepared by milling together the listed ingredients until the particles are substantially less than 5 microns in diameter.

25 parts by weight 2-benzothiazole carbamic acid, methyl ester
75 parts of isoparaffin oil (Soltrol 130, Phillips Petroleum Co.)

The product is diluted with 2 volumes of isoparaffin oil and is then applied in a low volume mist or fog type machine to give optimum coverage of foliage and fruit minimum amount of liquid.

Example 72

The following is an emulsifiable oil suspension formulation which is prepared as in Example 70 except that an emulsifier is added. The product is diluted with water at the rate of 1½ to 5 quarts per 100 gallons and is applied with standard low volume equipment. It may also be diluted with about 2 volumes of water and applied in a mist blower.

25 parts by weight 2-benzothiazole carbamic acid, methyl ester
69 parts isoparaffin oil (Soltrol 170, Phillips Petroleum Co.)
6 parts of polyoxyethylene esters of mixed fatty and resin acids This application is a continuation-in-part of my copending application Serial No. 519,231, filed June 30, 1955.

I claim:

1. A fungicidal composition comprising a surface-active dispersing agent and, in a fungicidally effective amount, a compound selected from the group represented by the formula

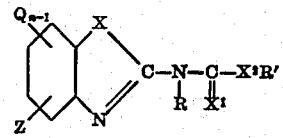

wherein X, X¹ and X² are selected from the group consisting of oxygen and sulfur, R is selected from the group consisting of hydrogen and lower alkyl groups of less than five carbon atoms, R' is an aliphatic hydrocarbon radical of less than five carbon atoms, Q is halogen, Z is selected from the group consisting of hydrogen and nitro, and $n$ is a whole number less than 4.

2. 2-benzothiazole carbamic acid, methyl ester.

3. The method for the control of fungi comprising applying to organic material subject to fungus infection, in a fungicidally effective amount, a compound selected from the group represented by the formula

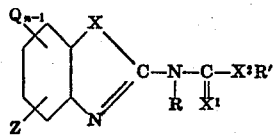

wherein X, X¹ and X² are selected from the group consisting of oxygen and sulfur, R is selected from the group consisting of hydrogen and lower alkyl groups of less than five carbon atoms, R' is an aliphatic hydrocarbon radical of less than five carbon atoms, Q is halogen, Z is selected from the group consisting of hydrogen and nitro, and $n$ is a whole number less than 4.

4. The method for the control of fungi comprising applying 2-benzothiazole carbamic acid, methyl ester, in a fungicidally effective amount, to organic material subject to fungus infection.

References Cited in the file of this patent

UNITED STATES PATENTS 2,710,824    Katz _____ June 14, 1955

OTHER REFERENCES

Takahashi et al.: Chem. Abst., vol. 44, col. 1979 (1950).

Davis et al.: J. Chem. Soc., vol. 1944, pp. 11–13.